United States Patent Office.

JULIUS EDMUND DOTCH, OF WASHINGTON, DISTRICT OF COLUMBIA.

Letters Patent No. 97,893, dated December 14, 1869; antedated October 14, 1869.

IMPROVED CONCRETE FOR PAVING AND FOR OTHER PURPOSES.

The Schedule referred to in these Letters Patent and making part of the same.

To all whom it may concern:

Be it known that I, JULIUS EDMUND DOTCH, of Washington, District of Columbia, have invented an Improved Concrete for Paving, Roofing, and other technical Purposes; and I do hereby declare that the following is a full and exact description thereof.

The nature of my invention consists in mixing asphaltum or bitumen, coal or pine-tar, pitch or resins, or any other hydrocarbon, with such animal or vegetable fibrous substances as can be most easily procured, such as sawdust, spent tan-bark, straw, cloth-shearers' flakes, (flocks,) wool-waste, or hair, &c., which I first saturate with linseed, cotton-seed, petroleum residuum, or other boiled oils.

To cheapen it, I use sometimes peat or turf, or anthracite-coal ashes, or hydraulic cement, &c.

The material will be best when some of the above fibrous materials are mixed with one or more of the hydrocarbons to the exclusion of sand or any other mineral or cement.

The fibrous substances to be used are rendered non-combustible by the intimate connection and saturation with the hydrocarbons during boiling, but I can render them still more so by impregnating them first with any of the metallic salts known to possess that property.

As a pavement, this concrete will combine all the advantages of a wooden pavement and a concrete, while some of the disadvantages from each separately are avoided.

In some instances, I treat the hydrocarbons with sulphur, either powdered or in the fluid state.

I employ and apply this mixture either in one continuous mass, or I mould and press it into blocks, tiles, slates, &c.

I make a foundation for streets and sidewalks of either beton, gravel, or broken stone, and sometimes I use for the same purpose facines, covered with furnace-slag or cement; and sometimes I lay my composition on any existing paved street or dirt-road.

What I claim as my invention, and desire to secure by Letters Patent, is—

1. The mixture of fibrous animal or vegetable matter, such as tan-bark, sawdust, flock, wool-waste, straw, or similar material, either in a dry state or the same treated with boiled linseed or other oils, with asphaltum, coal-tar, pitch, resin, or any other hydrocarbon, either used alone or in combination with peat, turf, coal-ashes, cinder, gravel, broken stone, sand, hydraulic cement, gypsum, infusorial earths, slate, marble-dust, brick-dust, or any other mineral.

2. The treatment of this mixture with sulphur, in the fluid state or dry.

3. A foundation for streets and sidewalks, of fascines, with slag or cement on the top.

JULIUS EDMUND DOTCH.

Witnesses:
CHAS. CONS. CALLAN,
J. W. WALSH.